(12) United States Patent
Kang et al.

(10) Patent No.: US 9,232,396 B2
(45) Date of Patent: Jan. 5, 2016

(54) DATA SHARING APPARATUS AND METHOD

(71) Applicant: Electronics and Telecommunications Research Institute, Daejeon (KR)

(72) Inventors: Kyu-Chang Kang, Daejeon (KR);
Dong-Oh Kang, Daejeon (KR);
Chang-Seok Bae, Daejeon (KR);
Joon-Young Jung, Daejeon (KR);
Jin-Young Moon, Daejeon (KR);
Hyung-Jik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 11 days.

(21) Appl. No.: 14/146,094

(22) Filed: Jan. 2, 2014

(65) Prior Publication Data
US 2014/0220937 A1 Aug. 7, 2014

(30) Foreign Application Priority Data
Feb. 1, 2013 (KR) .................. 10-2013-0011834

(51) Int. Cl.
*H04W 12/06* (2009.01)
*H04W 4/08* (2009.01)
*H04W 4/20* (2009.01)
*H04W 76/02* (2009.01)
*H04W 72/04* (2009.01)
*H04W 12/08* (2009.01)

(52) U.S. Cl.
CPC ............. *H04W 12/06* (2013.01); *H04W 4/08* (2013.01); *H04W 4/206* (2013.01); *H04W 76/023* (2013.01); *H04W 12/08* (2013.01); *H04W 72/04* (2013.01)

(58) Field of Classification Search
CPC ......... H04L 63/08; H04L 63/10; H04L 67/22; H04L 9/32; H04L 2209/24; H04W 12/06; H04W 72/04; H04W 4/08; H04W 4/206; G06F 21/41
USPC .............. 455/411; 726/26; 709/224, 201; 705/319, 14.73
See application file for complete search history.

(56) References Cited

U.S. PATENT DOCUMENTS

| 2011/0212686 A1 | 9/2011 | Lee et al. | |
| 2012/0180135 A1* | 7/2012 | Hodges et al. | 726/26 |
| 2013/0073473 A1* | 3/2013 | Heath | 705/319 |

FOREIGN PATENT DOCUMENTS

| JP | 2012-507238 | 3/2012 |
| KR | 10-2008-0090786 | 10/2008 |
| KR | 10-2012-0071680 | 7/2012 |

*Primary Examiner* — Phuoc H Doan
(74) *Attorney, Agent, or Firm* — Nelson Mullins Riley & Scarborough LLP; Anthony A. Laurentano; Lewis Lee

(57) ABSTRACT

Disclosed herein is an apparatus and method that enable data sharing to be performed between short-range/middle-range/long-range mobile terminals by minimizing specific intervention of a user. The apparatus includes a social relationship management unit for managing social network group information formed by a user while the user utilizes a social network service. A device recognition and authentication unit identifies a mobile terminal of another party attempting to make a connection and allocates a data communication channel for data exchange, based on device information received from the mobile terminal of the other party attempting to make a connection and the social network group information. A shared data setting unit sets data to be shared with the mobile terminal of the other party between which the data communication channel has been established. A shared data transmission unit transmits the data to be shared to the mobile terminal of the other party.

15 Claims, 7 Drawing Sheets

| IMPLICIT RELATIONSHIP | | U1 | | U2 | | |
|---|---|---|---|---|---|---|
| | | D1-1 | D1-2 | D2-1 | D2-2 | D2-3 |
| U1 | D1-1 | - | (S, F, C) | (S, F, C) | (S, F, C) | (S, F, C) |
| | D1-2 | (S, F, C) | - | (S, F, C) | (S, F, C) | (S, F, C) |
| U2 | D2-1 | (S, F, C) | (S, F, C) | - | (S, F, C) | (S, F, C) |
| | D2-2 | (S, F, C) | (S, F, C) | (S, F, C) | - | (S, F, C) |
| | D2-3 | (S, F, C) | (S, F, C) | (S, F, C) | (S, F, C) | - |

FIG. 6

DATA SHARING APPARATUS AND METHOD

CROSS REFERENCE TO RELATED APPLICATION

This application claims the benefit of Korean Patent Application No. 10-2013-0011834 filed on Feb. 1, 2013, which is hereby incorporated by reference in its entirety into this application.

BACKGROUND OF THE INVENTION

1. Technical Field

The present invention relates generally to a data sharing apparatus and method and, more particularly, to an apparatus and method that mutually authenticate mobile terminals having a communication function using communication between the mobile terminals and automatically or manually share data using communication depending on a relationship between the authenticated mobile terminals.

2. Description of the Related Art

Various types of technologies may be utilized to perform data communication between mobile terminals.

Near Field Communication (NFC) is noncontact short-range wireless communication technology using a frequency band of 13.56 MHz. NFC not only can provide data communication between mobile devices such as smart phones, but also can provide compatibility with existing noncontact smart card technology and Radio Frequency Identification (RFID) technology.

Bluetooth, which is an industrial standard for personal short-range wireless communication first created by Ericsson in 1994, enables various devices to securely communicate with each other at low cost.

Wireless Fidelity (WiFi) enables communication between an Access Point (AP), which basically functions to transfer data to the Internet, and a mobile terminal, such as a notebook computer or a smart phone, with which a user is provided with a service. Owing to the advantage of enabling access to the Internet or mutual communication without requiring a wire, various peripheral devices also support WiFi communication.

WiFi-direct provides the function of enabling devices equipped with a WiFi function to directly communicate with each other without passing through a WiFi-direct AP that supports a connection between WiFi devices.

Currently, various communication technologies that support short-range/middle range/long-range communication are present, and thus data communication between mobile devices may be performed using communication technology desired by a user.

However, a connection setup task for using individual communication technologies is complicated, and an authentication task for making a connection and setup tasks for sharing data when the connection has been made are complicated, thus causing a lot of inconvenience to a user.

Korean Patent Application Publication No. 10-2008-0090786 (entitled "Apparatus and method for sharing data between mobile devices") discloses technology for sharing data using a short-range communication means between mobile devices.

The above-described Korean Patent Application Publication No. 10-2008-0090786 discloses a mobile device which includes a communication unit for Bluetooth communication, a storage unit for storing data, a preference information control unit for controlling a search for shared data based on user preference information, and a search control unit for searching the device of another party for shared data using a preference information-based keyword via Bluetooth information based on the preference information, receiving retrieved data, and storing the retrieved data in the storage unit.

However, the technology disclosed in the above-described Korean Patent Application Publication No. 10-2008-0090786 does not disclose a configuration for establishing data sharing based on sociality information between devices, which is constructed using the social relationship of the human social network service of a user and the history of a connection between the devices.

SUMMARY OF THE INVENTION

Accordingly, the present invention has been made keeping in mind the above problems occurring in the prior art, and an object of the present invention is to provide an apparatus and method that enable data sharing to be performed between short-range/middle-range/long-range mobile terminals by minimizing specific intervention of a user.

In accordance with an aspect of the present invention to accomplish the above object, there is provided an data sharing apparatus including a social relationship management unit for managing social network group information formed by a user while the user utilizes a social network service; a device recognition and authentication unit for identifying a mobile terminal of another party attempting to make a connection and allocating a data communication channel for data exchange, based on device information received from the mobile terminal of the other party attempting to make a connection and the social network group information; a shared data setting unit for setting data to be shared with the mobile terminal of the other party between which the data communication channel has been established; and a shared data transmission unit for transmitting the data to be shared to the mobile terminal of the other party.

Preferably, the social network group information may include information about one or more of a family group member, a friend group member, and a colleague group member.

Preferably, the device information may include owner information, identification (ID) information, and available network information of the corresponding mobile terminal.

Preferably, the social relationship management unit may include a user interface enabling the social network group information to be reconfigured.

Preferably, the social relationship management unit may additionally manage information about a connection between mobile terminals possessed by group members of the social network service, and information about the connection between the mobile terminals may include a value indicating continuance strength of data exchange between the mobile terminals, frequency of a connection between the mobile terminals, and type of contents mutually transferred between the mobile terminals.

Preferably, the device recognition and authentication unit may parse the device information received from the mobile terminal of the other party attempting to make the connection, and allocate the data communication channel based on pre-configured sociality information.

Preferably, the shared data setting unit may set a data-sharing area to be shared with the mobile terminal of the other party between which the data communication channel has been established, depending on input of the user related to setting of the data-sharing area, and transmit the data to be shared to the shared data transmission unit as the data to be shared is selected from the data-sharing area.

Preferably, the shared data setting unit may automatically set a data-sharing area to be shared with the mobile terminal of the other party, based on data sharing history between mobile terminals connected to each other, and transmit the data to be shared to the shared data transmission unit as the data to be shared is selected from the data-sharing area.

Preferably, the data sharing apparatus may further include a shared data display unit for displaying the data to be shared.

In accordance with another aspect of the present invention to accomplish the above object, there is provided a data sharing method including managing, by a social relationship management unit, social network group information formed by a user while the user utilizes a social network service; identifying, by a device recognition and authentication unit, a mobile terminal of another party attempting to make a connection and allocating a data communication channel for data exchange, based on device information received from the mobile terminal of the other party attempting to make a connection and the social network group information; setting, by a shared data setting unit, data to be shared with the mobile terminal of the other party between which the data communication channel has been established; and transmitting, by a shared data transmission unit, the data to be shared to the mobile terminal of the other party.

Preferably, setting the data to be shared may include setting a data-sharing area to be shared with the mobile terminal of the other party between which the data communication channel has been established, depending on input of the user related to setting of the data-sharing area; and transmitting the data to be shared to the shared data transmission unit as the data to be shared is selected from the data-sharing area.

Preferably, setting the data to be shared may include automatically setting a data-sharing area to be shared with the mobile terminal of the other party, based on data sharing history between mobile terminals connected to each other; and transmitting the data to be shared to the shared data transmission unit as the data to be shared is selected from the data-sharing area.

Preferably, the data sharing method may further include displaying, by a shared data display unit, the data to be shared.

BRIEF DESCRIPTION OF THE DRAWINGS

The above and other objects, features and advantages of the present invention will be more clearly understood from the following detailed description taken in conjunction with the accompanying drawings, in which:

FIGS. 5 and 6 are diagrams illustrating the formation of an implicit relationship at the social relationship formation step of FIG. 3.

DESCRIPTION OF THE PREFERRED EMBODIMENTS

Figure 1:
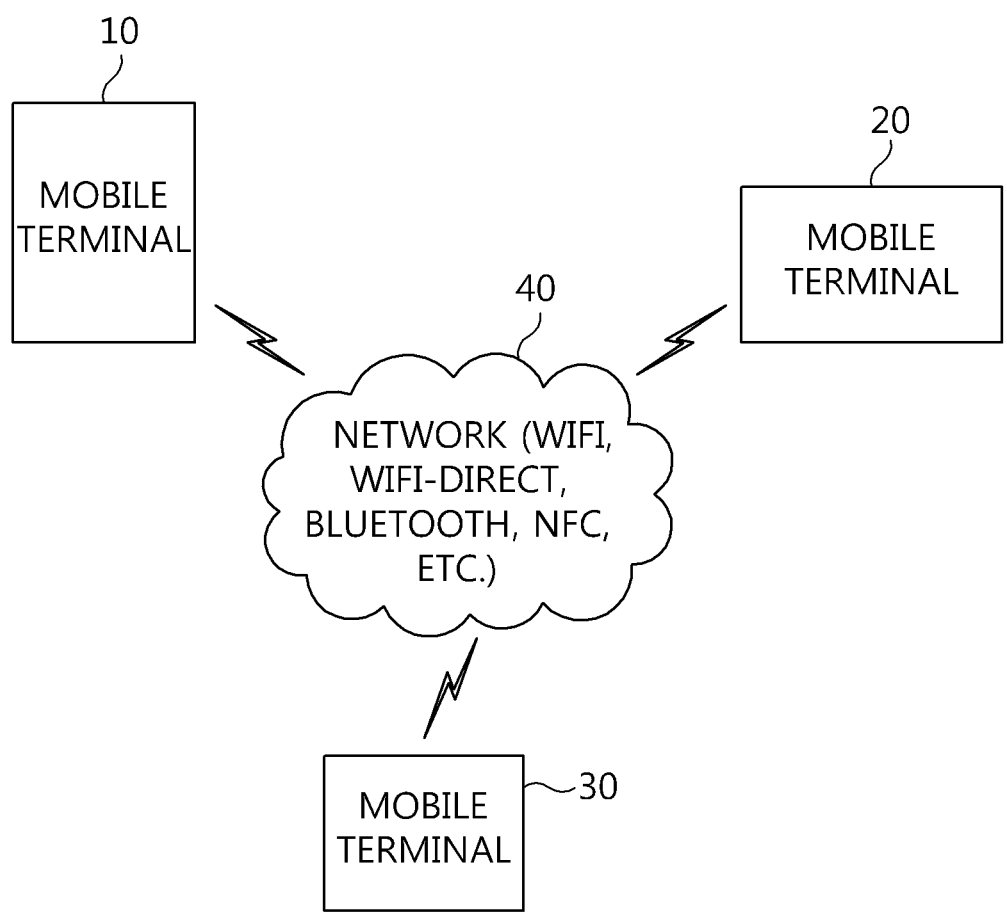
FIG. 1 is a network configuration diagram showing a network system to which the present invention is applied.

The present invention is technically characterized in that data sharing is established based on sociality information between devices, constructed using the social relationship of the human social network service of a user and the history of a connection between the devices. Accordingly, the present invention provides a structure for searching and analyzing the human social network service of a user so as to minimize the specific intervention of the user, utilizing a human relationship between device owners connected for data sharing as information for authentication between the devices, and variably setting the range of data to be shared depending on the analyzed user relationship.

Hereinafter, a data sharing apparatus and method according to embodiments of the present invention will be described in detail with reference to the attached drawings. Prior to the detailed description of the present invention, it should be noted that the terms or words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

FIG. 1 is a network configuration diagram showing a network system to which the present invention is applied.

In order to share data among mobile terminals 10, 20, and 30, each of the mobile terminals 10, 20, and 30 includes a data sharing apparatus. As circumstances demand, the data sharing apparatus may also be referred to as an 'application program.'

The mobile terminals 10, 20 and 30 each perform the function of sharing data among them over a network 40. Here, the network 40 is a communication infrastructure capable of performing short-range/middle-range/long-range data exchange in a Peer-to-Peer (P2P) manner via technology, for example, Near Field Communication (NFC), Bluetooth, WiFi, or WiFi-direct technology.

Therefore, the mobile terminals 10, 20, and 30 may perform the function of mutually sharing data over the network 40 including an NFC, Bluetooth, WiFi or WiFi-direct network.

Figure 2:
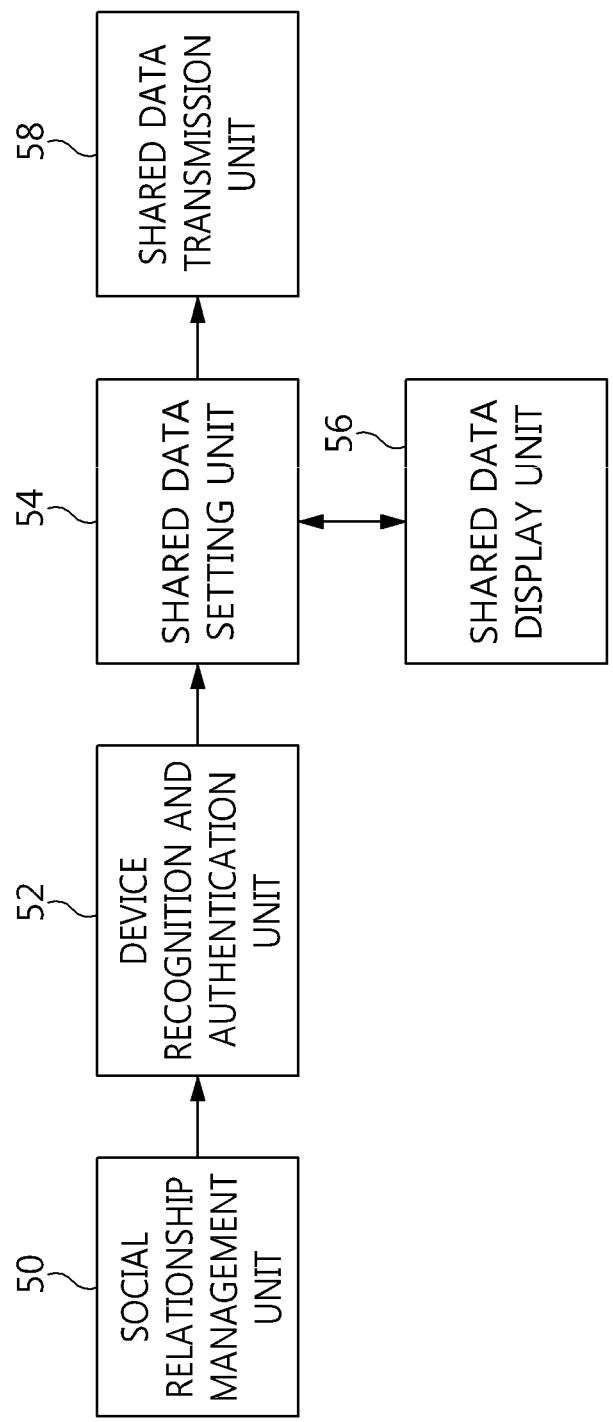
FIG. 2 is a block diagram showing a data sharing apparatus according to an embodiment of the present invention.

FIG. 2 is a block diagram showing a data sharing apparatus according to an embodiment of the present invention, wherein it may be understood that the data sharing apparatus, which will be described later, is installed in each of the mobile terminals 10, 20, and 30.

The data sharing apparatus includes a social relationship management unit 50, a device recognition and authentication unit 52, a shared data setting unit 54, a shared data display unit 56, and a shared data transmission unit 58.

The social relationship management unit 50 manages social network group information formed while a user uses a social network service and information about a connection between mobile terminals possessed by the group members of the social network service.

In this case, the social network group information may be, for example, information about a family group member, a friend group member, and a colleague group member. Further, information about the connection between the mobile terminals includes the strength of the connection, the frequency of the connection, the contents of the connection, etc.

The strength of the connection indicates how long valid data exchange continues when mobile terminals are mutually connected to each other, by a predetermined value. The frequency of the connection indicates how often mobile terminals are mutually connected, by a predetermined value. The contents of the connection indicate which contents (for example, multimedia, audio, video, text, etc.) are mutually transferred in a valid connection between the mobile terminals, by predetermined values. Here, unique values are preset for respective entities of the contents when indicating the values of the contents of the connection. The contents of the connection may be unified and displayed in the format of Multipurpose Internet Mail Extensions (MIME).

Meanwhile, the social relationship management unit 50 includes a user interface for allowing the user to edit a social relationship and reconstruct social network group information.

The device recognition and authentication unit 52 may identify a mobile terminal which attempts to make a connection when a connection to a control communication channel between mobile terminals desiring to share data is attempted, and allocate a data communication channel for data exchange. The device recognition and authentication unit 52 is configured to, when identifying a mobile terminal attempting to make a connection, determine the owner of the mobile terminal and a relationship between the owner and the current user, based on device information (e.g., owner information, ID information, and available network information of the corresponding terminal, etc.), received from the mobile terminal attempting to make the connection, and social network group information. Meanwhile, although the information about the connection between mobile terminals possessed by the group members of a social network service may not be directly used for identification, the strength, frequency, and contents of the connection to the mobile terminal which currently attempts to make a connection may be determined based on the information about the connection between the mobile terminals.

The shared data setting unit 54 sets data to be shared with the mobile terminal of another party with which a data communication channel has been established. The shared data setting unit 54 manually or automatically sets a data-sharing area to be shared with the mobile terminal of the other party with which the data communication channel has been established by the device recognition and authentication unit 52. If data to be shared is selected from the set data-sharing area, the shared data setting unit 54 sends the data to be shared to the shared data transmission unit 58.

Manual setting by the shared data setting unit 54 is configured to randomly set a data-sharing area to be shared between user groups or mobile terminals via the intervention of a user. Such manual setting has priority over automatic setting. In order to perform such manual setting, the shared data setting unit 54 may provide a user interface for allowing the user to set a data-sharing area.

Automatic setting by the shared data setting unit 54 is configured to set a data-sharing area to be shared when two mobile terminals are connected, based on data sharing history between the two mobile terminals connected to each other. When the data-sharing area, set when the two mobile terminals are connected in automatic setting, is manually released by the user, the automatic setting is ignored.

The shared data display unit 56 is configured to, if the data communication channel has been connected by the device recognition and authentication unit 52, and the data-sharing area to be shared has been set by the shared data setting unit 54, display only the data-sharing area to be shared by the mobile terminal to the user via the interface. If the data to be shared is selected by the user and has been transmitted to the mobile terminal of the other party, the shared data display unit 56 displays the shared data via a viewer.

The shared data transmission unit 58 transmits the set data to be shared to the mobile terminal of the other party.

Figure 3:
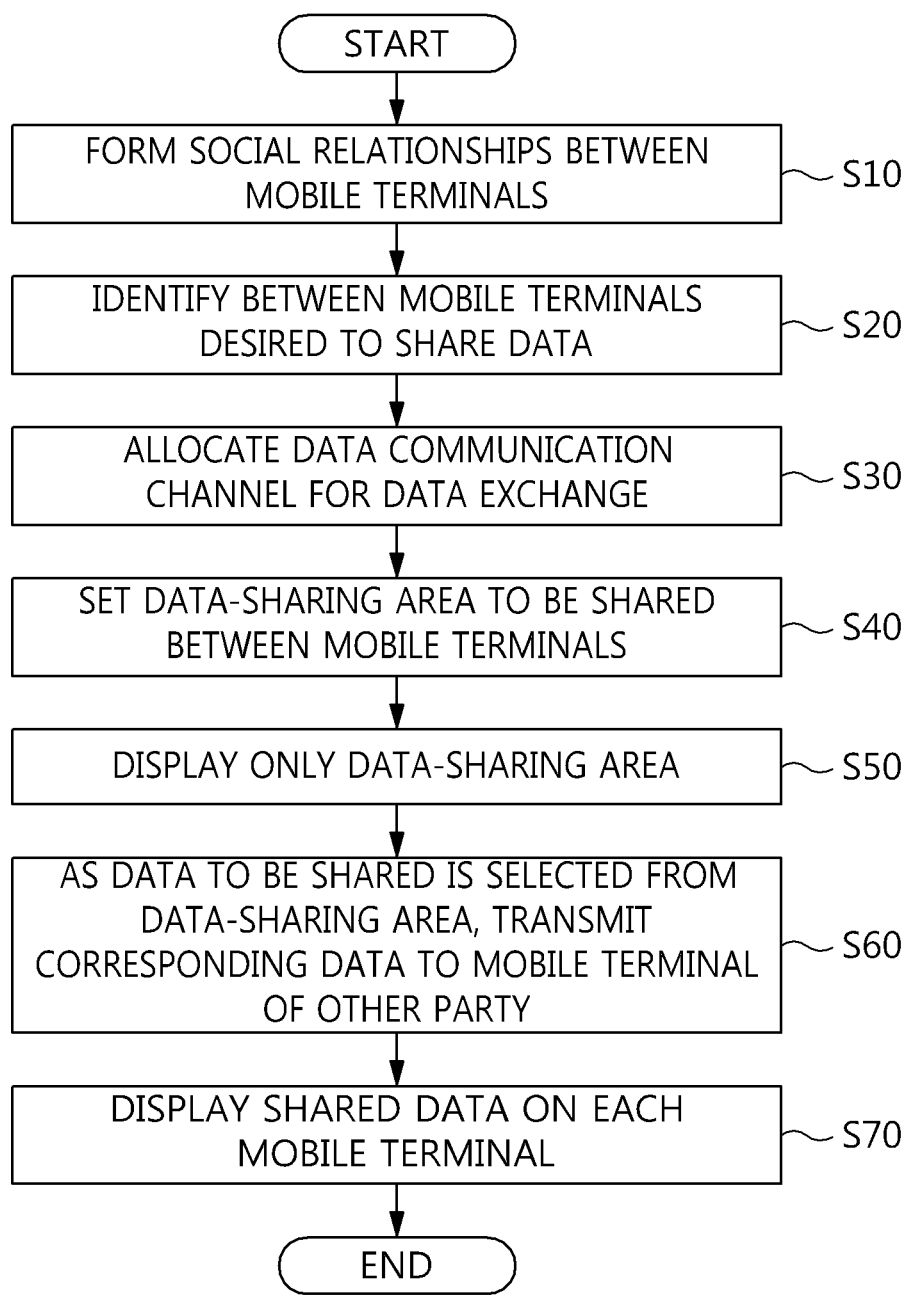
FIG. 3 is a flowchart showing a data sharing method according to an embodiment of the present invention.
Figure 4:
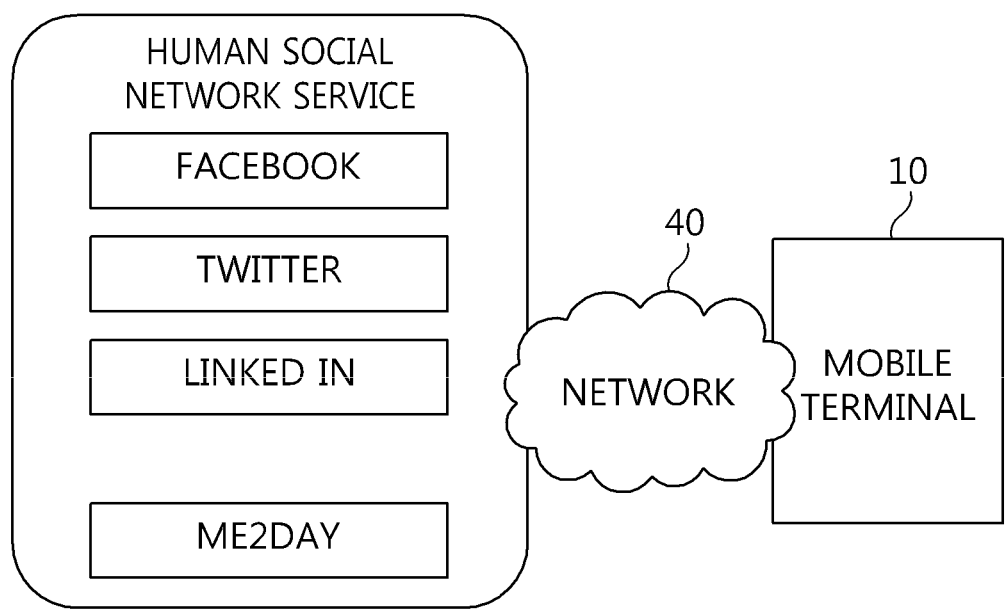
FIG. 4 is a diagram illustrating the formation of an explicit relationship at the social relationship formation step of FIG. 3.
Figure 5:
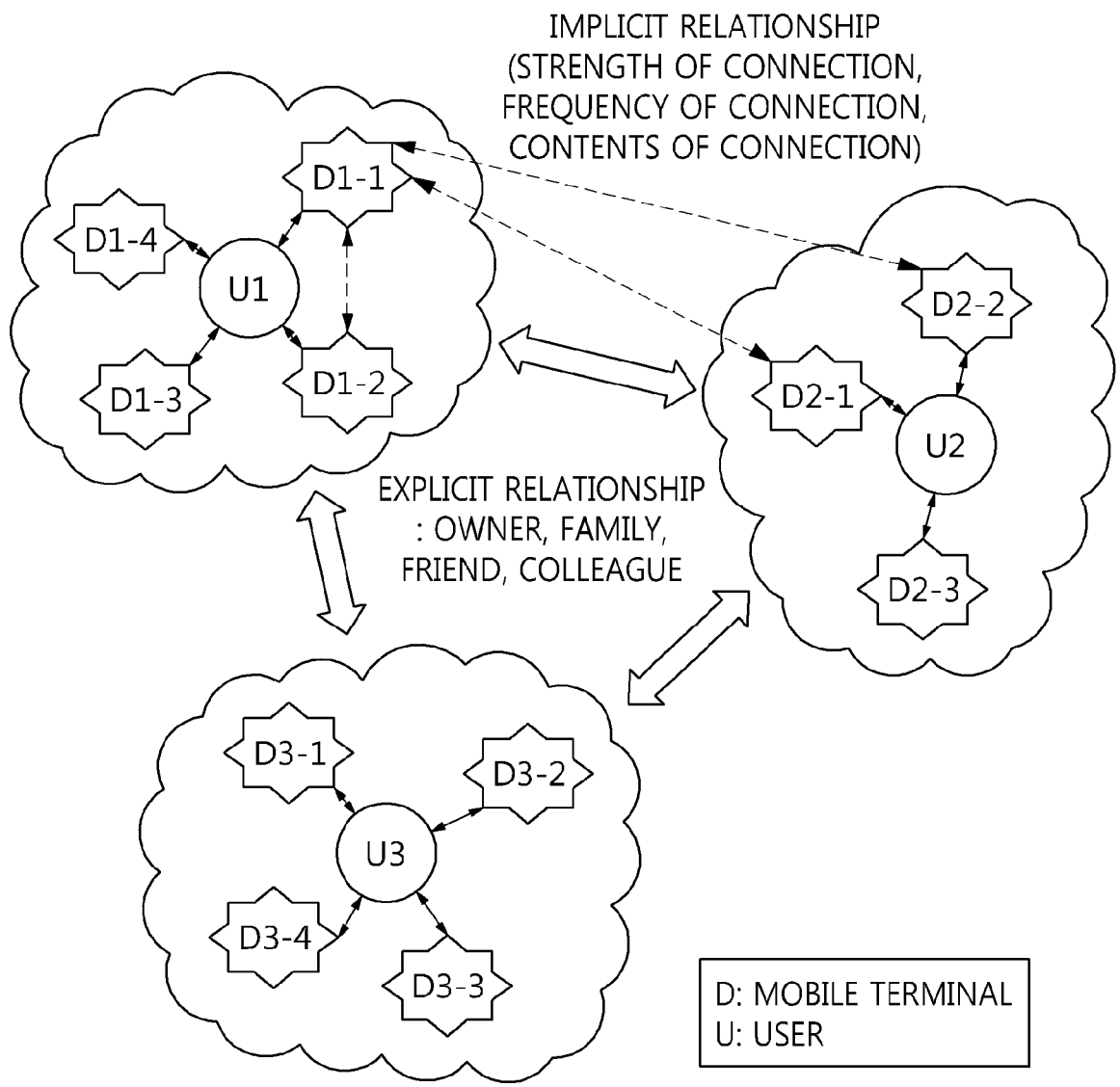
Figure 7:
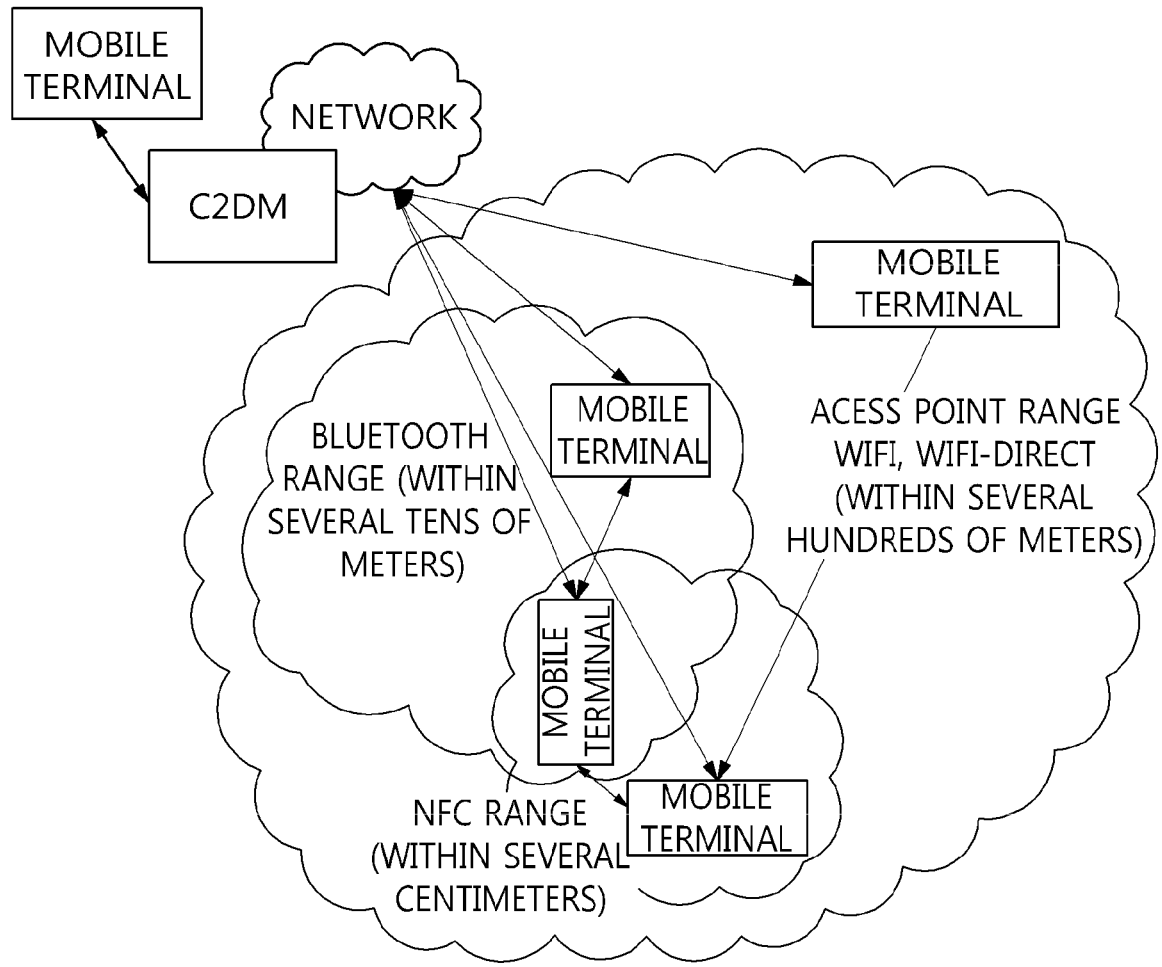
FIG. 7 is an exemplary diagram employed at the identification step and the data communication channel allocation step of FIG. 3.

Below, a data sharing method according to an embodiment of the present invention will be described in detail with reference to the flowchart of FIG. 3. FIG. 4 is a diagram illustrating the formation of an explicit relationship at the social relationship formation step of FIG. 3, FIGS. 5 and 6 are diagrams illustrating the formation of an implicit relationship at the social relationship formation step of FIG. 3, and FIG. 7 is an exemplary diagram employed at the identification step and the data communication channel allocation step of FIG. 3

First, the social relationship management unit 50 of each of the mobile terminals 10, 20, and 30 forms and manages social relationships between the mobile terminals at step S10.

Here, the social relationship management unit 50 forms social relationships between the mobile terminals via an explicit relationship formation procedure and an implicit relationship formation procedure.

The explicit relationship formation procedure requires a user's intervention, as shown in FIG. 4. For example, the explicit relationship formation procedure may extract members of a human group explicitly formed by the user, such as a family relationship, a friend relationship, and a colleague relationship with the user from human social network services (Facebook, Twitter, Linked in, me2day, etc.) used by the user and may determine whether the corresponding connection is that of a device having a family relationship, a friend relationship, or a colleague relationship with the user when making a connection between the mobile terminals. For this, the social relationship management unit 50 accesses the human social network service used by the user at time at which the manual update of the user is input or at an initially set time, and collects, stores, and manages social network group information of persons formed while the user utilizes the social network service. For example, the stored information may be information about a family group member, a friend group member, a colleague group member, etc.

The implicit relationship formation procedure collects statistics of phenomena in which mobile terminals are connected without the user's intervention and actually interact with each other. The implicit relationship formation procedure is configured to include three types of feature values, such as the strength (S), frequency (F), and contents (C) of each connection between mobile terminals, and use the three types of feature values as mutual relationship information in the network configuration illustrated in FIG. 5. The social relationship management unit 50 stores S, F, and C information (see FIG. 6) about connections between mobile terminals possessed by the members of the social network groups of the user. In FIG. 6, the strength of a connection is represented by "S=(time of connection)(sec)/(24*60*60)" (where 24*60*60 denotes a total time (hours) in one day). The frequency of a connection is represented by "F=number of connections/24." Consequently, the frequency of the connection may be regarded as the number of connections per hour. Further, in FIG. 6, the contents C of a connection denote which contents (for example, multimedia, audio, video, text, etc.) are mutually transferred in a valid connection between mobile terminals. Here, different specific values are preset for multimedia, audio, video, and text, respectively.

As described above, while or after a social relationship between mobile terminals is formed and managed, the device recognition and authentication unit 52 identifies a mobile terminal which attempts to make a connection when a connection to a control communication channel between mobile terminals desiring to share data is attempted at step S20. In this case, as shown in FIG. 7, the device recognition and authentication unit 52 supports the recognition of devices in short-range/middle-range/long-range. In order to support such device recognition, an NFC, Bluetooth, or WiFi-based communication infrastructure may be used.

In order to share data between mobile terminals, a mobile terminal, which requests data sharing, sends sharing session request information. Such sharing session request may be made using the following way.

NFC: this may be used when a sharing session request between mobile terminals located within a range of several centimeters is made. When the mobile terminals are caused to be close to each other, device information (that is, terminal information) is transmitted to the mobile terminal of the other party through a control communication channel, and thus approval of connection to a sharing session is required. In an embodiment, if two mobile terminals having an Android beam function are caused to be close to each other within a range of several centimeters or less, a connection is made by the Android NFC communication infrastructure, and the corresponding terminal may transmit its device information to the mobile terminal of the other party.

Bluetooth: this may be used when a sharing session request is made between mobile terminals located within a range of several meters. When mutual mobile terminals are paired via a search procedure (a scan and discovery procedure of Bluetooth), device information may be transmitted to the mobile terminal of the other party.

WiFi-direct: this may be used when a sharing session request is made between mobile terminals located within a range of several hundreds of meters. When WiFi-direct is used, the mobile terminals may be connected to each other without passing through a separate Access Point (AP). When the mobile terminals are connected to each other via the search and connection procedure, device information may be transmitted to the mobile terminal of the other party. In the case of WiFi, a separate AP is required, and a sharing session request may be made in a broadcasting manner to another mobile terminal at level lower than the AP, to which the apparatus making the sharing session request is connected.

Cloud to Device Messaging (C2DM): this may be used when a sharing session request is provided to a remote mobile terminal spaced apart from the current mobile terminal by a distance of several hundreds of meters or more. For example, device information may be transmitted using a smart phone in the form of a push message to the mobile terminal of the other party.

At the device recognition step for identification, the device information transferred to the mobile terminal of the other party includes owner information, ID information, available network information, etc. of the corresponding device.

As the mobile terminal is identified, the device recognition and authentication unit 52 allocates a data communication channel for data exchange at step S30. That is, once the identification of the mobile terminal of the other party is terminated, the device recognition and authentication unit 52 parses the device information received from the mobile terminal of the other party, and determines whether to connect the data communication channel, based on preconfigured sociality information. For example, the presence of sociality between mobile terminals means that specific mobile terminals more frequently communicate with each other. Therefore, sociality information has information containing such a meaning. In other words, sociality information in the device imitates human sociality information. The human sociality information is composed of originally generated static information (for example, a family relationship, kinship information, etc.), and dynamic information formed based on relationships (for example, a friend, a colleague, a team, a classmate, etc.). Therefore, the sociality information of the device may be composed of static information formed via the relationship of a device owner (for example, represented by group information in a human social network) and dynamic information (for example, represented by S, F, and C) formed via interaction relationships between the devices.

The data communication channel is connected based on Bluetooth, WiFi-direct, or WiFi communication.

At device recognition step S30 of allocating the data communication channel, it may be determined whether the mobile terminal that makes a sharing session request is another device of the user, the device of the user's family, the device of the user's friend, or the device of the user's colleague, and thus the data communication channel for data sharing may be connected.

Thereafter, the shared data setting unit 54 manually or automatically sets a data-sharing area to be shared between the mobile terminals between which the data communication channel is established by the device recognition and authentication unit 52 at step S40. In the case of manual setting, the shared data setting unit 54 may provide a user interface enabling the setting of the data-sharing area to the user.

If the data-sharing area has been set by the shared data setting unit 54, the set data-sharing area is displayed via the shared data display unit 56 at step S50.

Accordingly, the user selects data to be shared from the displayed data-sharing area.

If the user selects data to be shared, the shared data setting unit 54 transmits the selected data to be shared to the mobile terminal of the other party via the shared data transmission unit 58 at step S60.

Further, if the transmission of the selected data to be shared has been completed, the shared data display unit 56 of each of the mobile terminals displays the shared data via a viewer at step S70.

In an embodiment, a picture file sharing scenario between family members will be described below as an example. In this case, three types of preconditions may be present. A first precondition is that a mother and her children are included in a family group in a human social network service. A second precondition is that each of children separately designates a family-sharing folder in a photograph album in its smart phone and moves only picture files desired to be shared to the family-sharing folder. A third precondition is that the children and the mother have smart phones supporting NFC, and the data sharing apparatus of the present invention is installed in each of the smart phones of the children and the mother.

First, a child returned from a school journey executes the data sharing apparatus and connects to the mother's smart phone so as to show pictures to the mother.

Next, the two smart phones initiate NFC communication, and the child's smart phone sends device information to the mother's smart phone.

Accordingly, the mother's smart phone determines that the device requesting a connection is the device of a family member, based on the received device information, and approves the connection of a session (device recognition and authentication).

Thereafter, since the connection of the session has been approved, the child's smart phone shows a file list in the family-sharing folder of the photograph album to the child depending on preset sociality information, and the child selects a file desired to be shown to the mother (if automatic transmission is set, the contents of the folder may be entirely transmitted).

The selected file is transmitted to the mother's smart phone through the data communication channel, photo viewers are called by both smart phones at the same time that the transmission of the file is completed, thus allowing the child and the mother to view the picture together via their smart phones.

The scenario is a simple embodiment, and in addition, data may be conveniently shared in the form of "Touch & Go" when sociality information between devices formed based on human sociality is present.

As described above, in accordance with the present invention having the above configuration, a basis for sharing data between mobile terminals may be provided via a mutual recognition and authentication procedure between the mobile terminals using short-range/middle-range/long-range communication means.

In the mutual recognition and authentication procedure, human sociality information of a mobile terminal owner is utilized, so that a basis for simplifying a device authentication procedure, and if necessary, automatically setting shared data without a user's intervention is provided.

Meanwhile, the present invention is not limited to the above-described embodiments, and various modifications and additions are possible, without departing from the scope and spirit of the gist of the invention. Therefore, the technical spirit of the changes and modifications should be interpreted as being included in the scope of the accompanying claims.

What is claimed is:

1. A data sharing apparatus comprising:
   a social relationship management unit for managing social network group information formed by a user while the user utilizes a social network service;
   a device recognition and authentication unit for identifying a mobile terminal of another party attempting to make a connection in order to exchange data, and allocating a data communication channel for data exchange, based on device information received from the mobile terminal of the other party attempting to make a connection and the social network group information;
   a shared data setting unit for setting data to be shared with the mobile terminal of the other party between which the data communication channel has been established; and
   a shared data transmission unit for transmitting the data to be shared to the mobile terminal of the other party.

2. The data sharing apparatus of claim 1, wherein the social network group information comprises information about one or more of a family group member, a friend group member, and a colleague group member.

3. The data sharing apparatus of claim 1, wherein the device information comprises owner information, identification (ID) information, and available network information of the corresponding mobile terminal.

4. The data sharing apparatus of claim 1 wherein the social relationship management unit comprises a user interface enabling the social network group information to be reconfigured.

5. The data sharing apparatus of claim 1, wherein:
   the social relationship management unit additionally manages information about a connection between mobile terminals possessed by group members of the social network service, and
   information about the connection between the mobile terminals includes a value indicating continuance strength of data exchange between the mobile terminals, frequency of a connection between the mobile terminals, and type of contents mutually transferred between the mobile terminals.

6. The data sharing apparatus of claim 1, wherein the device recognition and authentication unit parses the device information received from the mobile terminal of the other party attempting to make the connection, and allocates the data communication channel based on preconfigured sociality information.

7. The data sharing apparatus of claim 1, wherein the shared data setting unit sets a data-sharing area to be shared with the mobile terminal of the other party between which the data communication channel has been established, depending on input of the user related to setting of the data-sharing area, and transmits the data to be shared to the shared data transmission unit as the data to be shared is selected from the data-sharing area.

8. The data sharing apparatus of claim 1, wherein the shared data setting unit automatically sets a data-sharing area to be shared with the mobile terminal of the other party, based on data sharing history between mobile terminals connected to each other, and transmits the data to be shared to the shared data transmission unit as the data to be shared is selected from the data-sharing area.

9. The data sharing apparatus of claim 1, further comprising a shared data display unit for displaying the data to be shared.

10. A data sharing method comprising:
    managing, by a social relationship management unit, social network group information formed by a user while the user utilizes a social network service;
    identifying, by a device recognition and authentication unit, a mobile terminal of another party attempting to make a connection in order to exchange data, and allocating a data communication channel for data exchange, based on device information received from the mobile terminal of the other party attempting to make a connection and the social network group information;
    setting, by a shared data setting unit, data to be shared with the mobile terminal of the other party between which the data communication channel has been established; and
    transmitting, by a shared data transmission unit, the data to be shared to the mobile terminal of the other party.

11. The data sharing method of claim 10, wherein the social network group information comprises information about one or more of a family group member, a friend group member, and a colleague group member.

12. The data sharing method of claim 10, wherein the device information comprises owner information, identification (ID) information, and available network information of the corresponding mobile terminal.

13. The data sharing method of claim 10, wherein setting the data to be shared comprises:
    setting a data-sharing area to be shared with the mobile terminal of the other party between which the data communication channel has been established, depending on input of the user related to setting of the data-sharing area; and
    transmitting the data to be shared to the shared data transmission unit as the data to be shared is selected from the data-sharing area.

14. The data sharing method of claim 10, wherein setting the data to be shared comprises:
    automatically setting a data-sharing area to be shared with the mobile terminal of the other party, based on data sharing history between mobile terminals connected to each other; and
    transmitting the data to be shared to the shared data transmission unit as the data to be shared is selected from the data-sharing area.

15. The data sharing method of claim 10, further comprising displaying, by a shared data display unit, the data to be shared.

* * * * *